Feb. 24, 1942.  F. S. WALKER  2,274,285
COMBINED LUNCH KIT AND ELECTRIC GRIDDLE
Filed Nov. 20, 1939   2 Sheets-Sheet 1
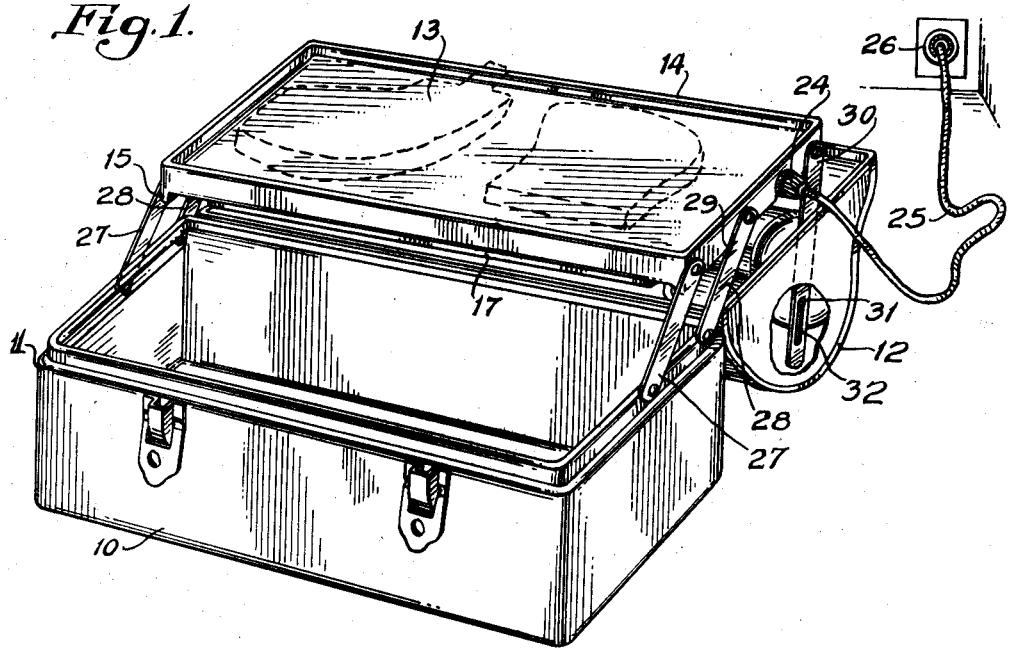
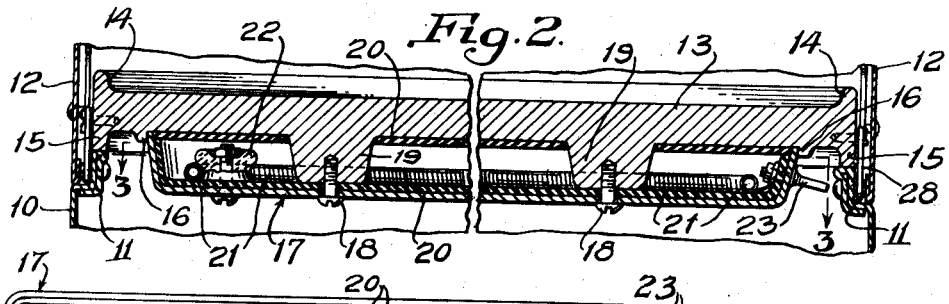
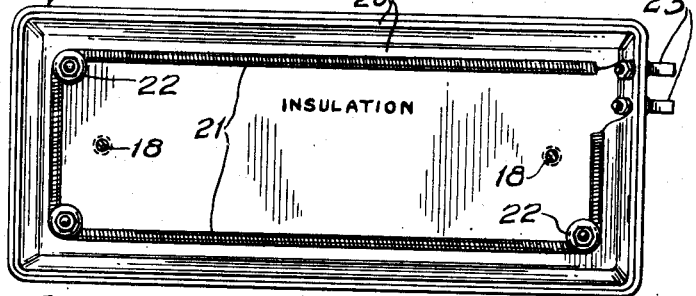
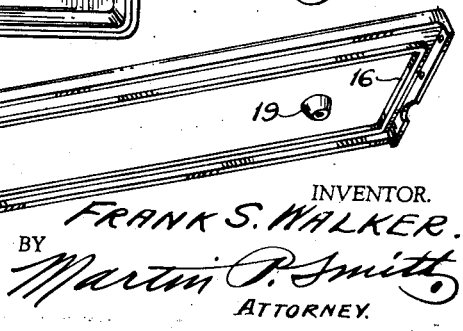
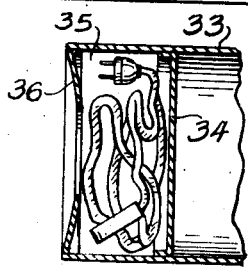
INVENTOR.
FRANK S. WALKER.
BY Martin P. Smith
ATTORNEY.

Feb. 24, 1942. F. S. WALKER 2,274,285
COMBINED LUNCH KIT AND ELECTRIC GRIDDLE
Filed Nov. 20, 1939 2 Sheets-Sheet 2
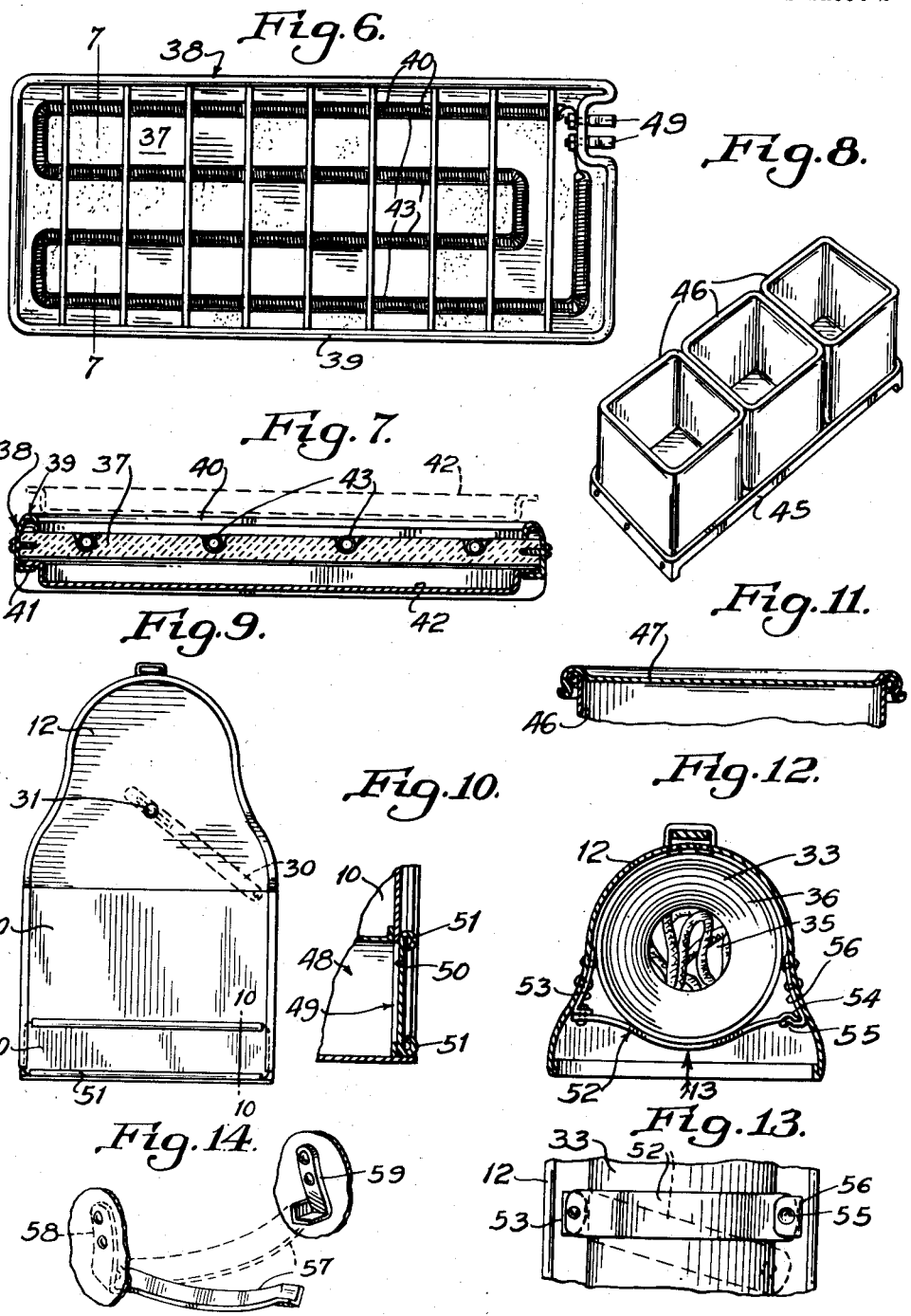
INVENTOR.
FRANK S. WALKER
BY
ATTORNEY.

Patented Feb. 24, 1942

2,274,285

UNITED STATES PATENT OFFICE 2,274,285

COMBINED LUNCH KIT AND ELECTRIC GRIDDLE

Frank S. Walker, Los Angeles, Calif.

Application November 20, 1939, Serial No. 305,308

3 Claims. (Cl. 219—19)

My invention relates to a kit that includes a conventional lunch box or container having combined therewith an electrically heated griddle or hot plate.

The principal objects of my invention are, to provide a relatively simple, practical and portable kit or container that is compact in structure, light in weight, capable of being readily cleaned and maintained in a sanitary condition, simple in operation, and the kit in addition to serving as a convenient container for food and a removable liquid container, includes simple and practical means in the form of an electrically heated plate which enables various food stuffs to be fried, grilled, broiled, or toasted, and also provides for the heating and boiling of liquids and for the baking of small articles of food.

A further object of my invention is, to provide a griddle or hot plate that is combined with the main body of the box and the cover thereof so that said griddle or plate is automatically elevated when the lid or cover of the box is opened and likewise automatically lowered into position within the upper portion of the box when the lid or cover is closed.

Further objects of my invention are, to provide a combined lunch kit and griddle of the character referred to wherein the main body portion of the box is provided in its lower portion with a separate compartment adapted to receive knives, forks, spoons, napkins, and the like, further, to provide simple and effective means for firmly holding a liquid container within the cover of the kit and further, to construct the liquid container with a separate compartment, preferably at its lower end, and which compartment is adapted to receive the electric cord that is utilized for conducting current to the griddle or hot plate.

A further object of my invention is, to construct the griddle or hot plate so that it will conveniently receive a plurality of separate receptacles for food that is to be heated or cooked, thus providing for the simultaneous heating or cooking of a number of different foods or liquids.

With the foregoing and other objects in view, my invention consists in certain novel features of construction and arrangement of parts that will be hereinafter more fully described and claimed and illustrated in the accompanying drawings in which:

Fig. 1 is a perspective view of a combined lunch kit and griddle plate constructed in accordance with my invention, showing the kit open with the griddle elevated for use.

Fig. 2 is a longitudinal section taken through the upper portion of the box or container and through the lower portion of the hinged cover of the box and showing the griddle or hot plate in the position it occupies while not in use.

Fig. 3 is a horizontal section taken on the line 3—3 of Fig. 2.

Fig. 4 is a perspective view looking against the under side of the griddle or hot plate.

Fig. 5 is a sectional view of the lower end of the liquid container that is carried in the cover of the kit and showing the compartment that is adapted to receive accessories, such as the electric cord that carries current to the griddle.

Fig. 6 is a top plan view of a modified form of the griddle or hot plate.

Fig. 7 is an enlarged cross section taken on the line 7—7 of Fig. 6.

Fig. 8 is a perspective view of a plurality of food containers assembled on a support, which latter is adapted to be positioned on the hot plate so as to simultaneously heat or cook a number of different food stuffs.

Fig. 9 is an end elevational view of a modified form of the box or kit.

Fig. 10 is an enlarged vertical section taken on the line 10—10 of Fig. 9.

Fig. 11 is a detail section showing a cover for the food containers that are positioned on the griddle or hot plate.

Fig. 12 is a cross section of the hinged cover of the kit or box and showing a liquid container removably positioned therein.

Fig. 13 is a detail view looking in the direction indicated by the arrow 13 in Fig. 12.

Fig. 14 is a detail perspective view of a modified form of the means utilized for retaining the liquid receptacle within the cover of the kit.

Referring by numerals to the accompanying drawings and particularly to the construction illustrated in Figs. 1 to 5 inclusive, 10 designates a box having front and end walls and a bottom, which walls and bottom may be constructed of any suitable material, for instance, sheet metal, and the upper portions of the material forming the walls is folded double so as to materially strengthen and reinforce the upper portion of the box structure. The portions of double thickness and which are designated by the numeral 11 are extended inwardly a short distance and thence upwardly in order to provide a support for the griddle or hot plate that forms a part of the kit and for the lower edges of the walls of the cover of the box.

Connected by suitable hinges (not shown) to the upper portion of the rear wall of box 10 is a cover 12, preferably formed of sheet metal, and which comprises a pair of end walls and front, rear and top walls that are substantially of inverted U-shape in cross section. The depth of the cover 12 is such as to conveniently receive a liquid container and which latter is generally cylindrical in shape. When the cover 12 occupies a closed position on top of the box 10 it is retained in such position by complementary latch members that are located on the upper portion of the front wall of the box and lower portion of the front wall of the cover.

The griddle or hot plate that is combined with the box or container comprises a substantially rectangular plate 13 that may be either cast or pressed in a single piece and formed of metal, preferably aluminum, and formed along the edges on the top of this plate are flanges 14 that are designed to prevent grease and other liquids, as well as small crumbs or particles of food stuff that is being heated or cooked on the plate, from dropping off the edges thereof.

Depending from the under side of the plate 13 along its edges are flanges 15 which, when the cover of the kit is closed, rest directly upon the upper edges of the inset portions 11 of double thickness along the upper edges of the side and end walls of the box (see Fig. 2).

Formed on the under side of the plate 13 a short distance inwardly from the flanges 15 are narrow depending flanges 16 that provide bearings for the upper edges of the side and end walls of a shallow pan 17 and which latter functions as a housing for the heating element that is associated with plate 13. This pan is detachably secured to plate 13 by means of screws 18 that enter lugs 19, which latter are formed integral with and depend from the under side of plate 13. The pan 17 and under side of plate 13 are lined with a suitable layer or layers 20 of suitable insulating material, for instance, asbestos or mica, and positioned within the pan is a heating coil 21, preferably wire that is heated as a result of the passage of an electric current therethrough. This heating coil is retained in position within the insulated chamber in the pan 17 by suitable insulators 22 that are carried by the pan.

Obviously, the heating element might take the form of a strip or strips of thin ribbon-like metal.

The terminals of the heating coil are connected to contact pins or posts 23 that are seated in and insulated from the right hand end wall of the pan 17 at a point near the rear wall of said pan and thus, said pins are located beneath the rear right hand corner of plate 13.

Pins 23 are adapted to receive a conventional socket 24 that is carried by the end of an electric cord 25 and arranged on the other end of this cord is a plug 26 that is adapted to be removably positioned in a wall socket or the like and which is connected to a source of electric current supply.

The lower ends of links 27 are pivotally connected to the outer faces of the inset double thickness portions 11 on the upper edges of the end walls of the box 10 and the upper ends of these links are pivotally connected to the ends of plate 13 immediately to the rear of its forward corners.

A second pair of links 28 are arranged parallel with the links 27 and the lower ends of said links 28 are pivotally connected to the inset upper portions of the end walls of the box adjacent the rear corners thereof. The upper ends of the links 28 are pivotally connected to the ends of the plate 13 at points approximately midway between its front and rear edges.

In order to provide a rest for the plate 13 when the cover of the box is open and the plate is elevated for use, lugs such as 29 are formed integral with the upper portions of the links 28 and project inwardly a short distance so as to occupy positions beneath the end walls 15 on plate 13 when the same is elevated.

The upper ends of a third pair of links 30 are pivotally connected to the ends of plate 13 adjacent its rear edge and these links extend downwardly inside the end walls of the cover 12 and seated in said end walls are inwardly projecting pins or rivets 31 that pass through short longitudinally disposed slots 32 that are formed in the lower portions of said links 30.

By providing the pairs of parallel links 27 and 28 between the upper portion of the box 10 and the plate 13, the latter is maintained in a practically horizontal position while the cover is being swung from open to closed position and vice versa and the links 30 in addition to providing supports for the rear portion of the plate when the same is elevated, serve to impart swinging movement to the plate 13 when the cover is opened and closed.

In the use of the kit as described, the cover is swung upwardly, rearwardly and thence downwardly until it occupies a position rearwardly of the box 10 and through the links 27, 28 and 30 the opening movement of the cover swings the plate 13 upwardly and rearwardly until it occupies a position above the rear portion of the box and above the front portion of the cover.

The socket 24 of the electric cord 25 and which latter is connected to a source of current supply is now applied to the posts or contact pins 23 with the result that electric current flows through the coil 21 to heat the same and thereby heat plate 13.

When the plate has become heated to the proper degree, various food stuffs may be cooked thereon and water in suitable containers may be heated and boiled to be used in making tea, hot chocolate and other hot drinks, and also coffee in suitable containers, for instance, the metal bottle or container that is normally stored in the cover 12 may be placed on the plate 13 and heated to the desired degree.

In Fig. 5 I have illustrated the lower portion of the metal bottle or container that is carried within the cover 12 and in accordance with my invention the wall 33 of this bottle or container may be extended a short distance downwardly from the bottom 34, thus providing a compartment 35 that is adapted to receive the electric cord 25 or other accessories capable of being used with the kit.

Where the compartment 35 is utilized for the reception of the electric cord, a flange 36 is secured to the lower end of the wall 33 of the bottle and which flange extends upwardly and inwardly, thus enabling the cord to be conveniently positioned within the chamber 35 and said flange also retaining the cord after being packed within the chamber or compartment.

In Figs. 6 and 7 I have illustrated a modified form of the electrically heated member of the kit. This modification comprises a plate-like body 37 of refractory material that is secured within a frame 38, the latter being preferably formed of sheet metal, and having on its upper edge a bead 39 that overlies the upper edges of the body 37. Secured to beads on the front and rear of the frame are supporting members 40, preferably wires, that are disposed a short distance above the upper surface of body 37. The lower portions of the frame 38 at the ends of the body 37 terminate in inwardly presented flanges 41 that are adapted to receive and support a shallow pan in position beneath the plate while said pan is not in use.

A heating element 43, preferably a coil of wire or metal ribbon that is heated as the result of the passage of an electric current therethrough, occupies a groove that is formed in the upper surface of body 37, the ends of said heating element being connected to pins or posts 44 that project from the right hand end of the body adjacent its rear edge, said pins or posts being adapted to enter a socket that is carried by an electric cord.

Where this form of heater is employed, various cooking utensils or like containers may be positioned on top of the wires 40 and thus the bottom of said utensils are supported a slight distance above the surface of the body 37 in which the heating coil is embedded.

In Fig. 8 I have shown a base plate 45 adapted to be positioned on top of the wires or rods of the heater illustrated in Figs. 6 and 7 and supported by said base is a plurality of separate receptacles 46 that are adapted to contain food stuffs to be heated or cooked.

In Fig. 11 I have shown one of the receptacles 46 provided with a readily removable cover 47.

In Figs. 9 and 10 I have shown the body portion 10 of the lunch box or kit provided in its lower portion with a chamber 48 that is adapted to hold various articles, for instance, cooking utensils, knives, forks, spoons, napkins, and the like, said chamber being open at one end through the end wall of the body 10 as designated by 49 and this opening being normally closed by a door 50 comprising a plate of sheet metal or the like that is arranged for sliding movement on the external face of the end wall of the box. The upper and lower edges of this plate are provided with beads 51 to facilitate the movement of said plate vertically.

In Figs. 12 and 13 I have illustrated means for securing the liquid container in the top or cover 12 of the kit, such means comprising a strip 52 of resilient metal that is pivotally connected at one end to a bracket 53 arranged within the cover on one side thereof and the free end of said resilient strip being bent to form a recess 54 that receives a projection 55 that is punched or bent upwardly from a bracket 56 that is secured within the cover on the opposite side from bracket 53.

When the strip 52 lies across the under side of the bottle or container with the stud 55 engaged in the recess 54, said container will be firmly held within the cover and when it is desired to remove the bottle or container, the free end of strip 52 is disengaged from bracket 56 and swung in one direction or the other approximately ninety degrees so as to permit the ready removal of the receptacle.

In Fig. 14 I have shown a modified form of the liquid containing bottle or receptacle and in this construction, a strip of resilient metal 57 is pivotally connected at one end to a bracket 58 arranged within the cover and the free end of this strip is adapted to engage the bent end of a keeper 59 that is secured on the inside of the cover opposite from the bracket 58.

The insetting of the portions 11 of double thickness along the upper edges of the walls of the box 10 provides a support for the plate or griddle 13 and enables the lower edges of the walls of the cover when closed to extend downwardly onto the shoulders at the lower ends of said inset portions as illustrated in Fig. 2 and the insetting of the upper edges of the end walls of the box provides sufficient space for the accommodation of the links that connect the ends of the griddle to the box and to the cover thereof.

It is to be understood that my invention contemplates the embodiment or combination of any form of container or receptacle and an electrically heated plate, grid, or similar appliance, capable of being used for the heating and cooking of food stuffs and likewise for the heating of liquids.

Thus it will be seen that I have provided a combined lunch kit and electric griddle that is relatively simple in construction, inexpensive of manufacture and very effective in performing the functions for which it is intended.

The kit comprises a simple, practical and convenient container that may be used by workmen in factories, by office workers, by students, or in fact by all persons who carry their lunches, and the kit in addition to providing a convenient container for food and beverages enables the users of the kit to heat or cook certain of the food stuffs and likewise to heat beverages or liquids used in the making of beverages.

It will be understood that minor changes in the size, form and construction of the various parts of my improved combined lunch kit and electric griddle, may be made and substituted for those herein shown and described, without departing from the spirit of my invention, the scope of which is set forth in the appended claims.

I claim as my invention:

1. A combined lunch kit and electric griddle comprising in combination, a container, a cover hinged to the rear wall of said container, a griddle which when the cover is closed rests on the upper edges of the end walls of said container and connections between said container, said cover and said griddle for raising and lowering said griddle as said cover is opened and closed and maintaining said griddle in a plane parallel with the plane occupied by the top of the container during its movement toward and away from said container.

2. A combined lunch kit and electric griddle as set forth in claim 1, with an electric heating coil carried by the under side of said griddle.

3. A combined lunch kit and electric griddle as set forth in claim 1, with a shallow housing detachably secured to the under side of said griddle and an electric heating coil removably positioned within and insulated from said housing.

FRANK S. WALKER.